(12) United States Patent
Lucas Barcias

(10) Patent No.: US 11,446,568 B2
(45) Date of Patent: Sep. 20, 2022

(54) IMAGE-BASED DATA COMMUNICATION DEVICE IDENTIFICATION

(71) Applicant: Sony Interactive Entertainment Inc., Tokyo (JP)

(72) Inventor: Jesus Lucas Barcias, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 320 days.

(21) Appl. No.: 16/635,693

(22) PCT Filed: Jul. 13, 2018

(86) PCT No.: PCT/GB2018/051993
§ 371 (c)(1),
(2) Date: Jan. 31, 2020

(87) PCT Pub. No.: WO2019/025753
PCT Pub. Date: Feb. 7, 2019

(65) Prior Publication Data
US 2020/0406130 A1    Dec. 31, 2020

(30) Foreign Application Priority Data
Aug. 4, 2017  (GB) ..................................... 1712573

(51) Int. Cl.
*H04N 7/18*     (2006.01)
*H04W 64/00*    (2009.01)
(Continued)

(52) U.S. Cl.
CPC .......... *A63F 13/235* (2014.09); *A63F 13/213* (2014.09); *A63F 13/323* (2014.09);
(Continued)

(58) Field of Classification Search
CPC ........ G06T 7/70; H04B 17/318; H04N 7/183; H04W 8/005; H04W 40/246; H04W 84/18
See application file for complete search history.

(56) References Cited

U.S. PATENT DOCUMENTS 9,781,259 B1 * 10/2017 Kodaypak ............. H04L 67/303
10,440,513 B2 * 10/2019 Todeschini ............ H04W 4/023
(Continued)

FOREIGN PATENT DOCUMENTS

CN        105629196 A    6/2016
KR     1020120043997 A    5/2012
(Continued)

OTHER PUBLICATIONS

International Search Report and Written Opinion for corresponding PCT Application No. PCT/GB2018/051993, 14 pages, dated Oct. 5, 2018.

(Continued)

*Primary Examiner* — William G Trost, IV
*Assistant Examiner* — Adam A Cooney
(74) *Attorney, Agent, or Firm* — Matthew B. Dernier, Esq.

(57) ABSTRACT

Data processing apparatus includes data communication circuitry to communicate data, by wireless radio frequency communication, with a set of one or more external devices, the data communication circuitry being configured to detect a corresponding wireless signal strength of a data communication from each of the set of external devices; a data processor to detect a respective estimated separation of each of the set of external devices from the apparatus in dependence upon the respective detected wireless signal strengths; and an image processor to detect, in images captured by a camera, an image of an external device having image (Continued)

properties consistent with the estimated separation of a given one of the set of external devices from the apparatus and to associate the external device detected in the images captured by the camera with data communications between the apparatus and the given one of the set of external devices.

10 Claims, 6 Drawing Sheets

(51) Int. Cl.
| | | |
|---|---|---|
| *H04W 8/00* | (2009.01) | |
| *H04W 40/24* | (2009.01) | |
| *A63F 13/65* | (2014.01) | |
| *H04B 17/318* | (2015.01) | |
| *G06T 7/70* | (2017.01) | |
| *G16Y 10/75* | (2020.01) | |
| *A63F 13/235* | (2014.01) | |
| *A63F 13/213* | (2014.01) | |
| *A63F 13/323* | (2014.01) | |

(52) U.S. Cl.
CPC .............. *A63F 13/65* (2014.09); *G06T 7/70* (2017.01); *G16Y 10/75* (2020.01); *H04B 17/318* (2015.01); *H04N 7/183* (2013.01); *H04W 8/005* (2013.01); *H04W 40/246* (2013.01); *H04W 64/00* (2013.01)

(56) References Cited

U.S. PATENT DOCUMENTS

| | | | |
|---|---|---|---|
| 2012/0046044 A1 | 2/2012 | Jamtgaard | |
| 2013/0225199 A1 | 8/2013 | Shaw | |
| 2014/0155104 A1 | 6/2014 | Jarvis | |
| 2015/0147936 A1* | 5/2015 | Hornsby | A63H 17/36 446/456 |
| 2015/0181384 A1* | 6/2015 | Mayor | H04W 4/021 455/456.1 |
| 2015/0195008 A1* | 7/2015 | Johnson | H04W 4/06 455/41.2 |
| 2015/0247912 A1 | 9/2015 | Tang | |
| 2015/0350561 A1 | 12/2015 | Vartanian | |
| 2016/0295364 A1* | 10/2016 | Zakaria | H04L 67/12 |
| 2016/0335871 A1* | 11/2016 | Kim | G08B 21/0286 |
| 2017/0056783 A1* | 3/2017 | Akavia | G06V 20/10 |

FOREIGN PATENT DOCUMENTS

| | | |
|---|---|---|
| KR | 1020170039463 A | 4/2017 |
| WO | 2012000138 A1 | 1/2012 |
| WO | 2015125144 A1 | 8/2015 |

OTHER PUBLICATIONS

Combined Search and Examination Report for corresponding GB Application 1712573.3, 4 pages, dated Jan. 9, 2018.
Examination Report for corresponding GB Application 1712573.3, 3 pages, dated Nov. 5, 2019.

\* cited by examiner

IMAGE-BASED DATA COMMUNICATION DEVICE IDENTIFICATION

BACKGROUND

Field

This disclosure relates to data communications.

Description of Related Art

In data communication between so-called "Internet of Things" (IoT) devices, a variety of wireless data communication protocols are in use. IoT devices are typically low power, low range communication devices having specific functionality.

In the context of an apparatus such as a computer games machine communicating with such IoT devices, it can be useful for the apparatus to know where such devices are in the real environment around the apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure is defined by the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
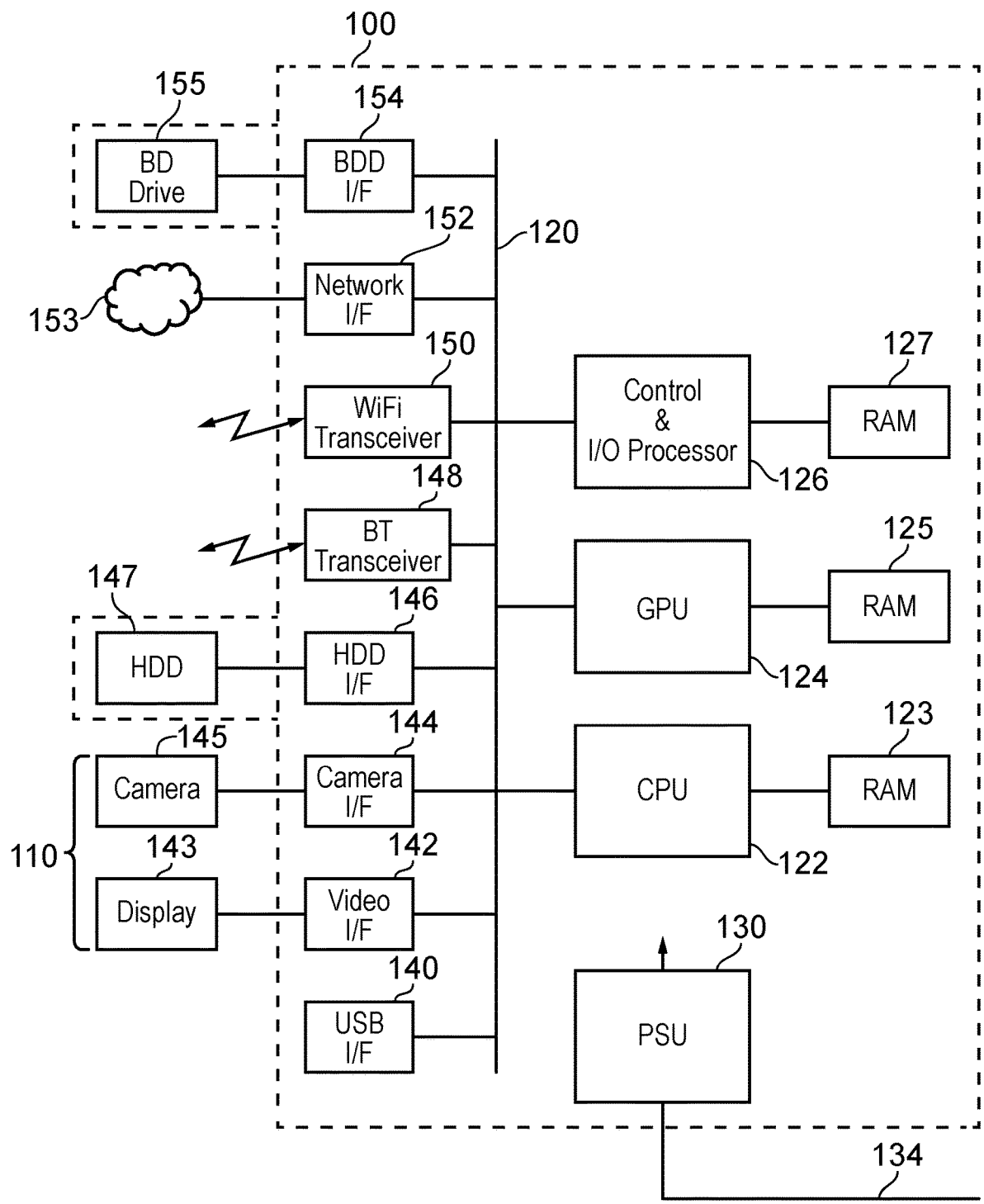
FIG. 1 schematically illustrates a data processing apparatus.

FIG. 1 schematically illustrates a data processing apparatus such as (purely by way of example) a Sony® PlayStation 4® Games Console. The apparatus of FIG. 1 comprises a main unit 100 and various connectable peripherals 110.

The main unit 100 comprises various components, many of which are interconnected by a bus structure 120. By way of example, these components comprise: a central processing unit (CPU) 122, a graphics processing unit (GPU) 124 and a control and input/output (I/O) processor 126, each of which has associated random access memory (RAM) 123, 125, 127. A power supply unit (PSU) 130 is connectable to a mains or other power supply 134.

Further components connected to the bus structure 120 include a universal serial bus (USB) interface (I/F) 140, a video interface 142, a camera interface 144, a hard disk drive (HDD) interface 146, a Bluetooth (BT) transceiver 148, a WiFi transceiver 150 (a generic term for a transceiver operating under one or more of the IEEE 802.11 standards), a network interface 152 and Blu-Ray® disk drive (BDD) interface 154.

Considering the function of these components, the CPU 122 and GPU 124 cooperate to execute computer software to perform the main functions of the data processing apparatus such as (in this example) computer gaming functions. The control and I/O processor 126 performs functions relating to the overall control of operation of the apparatus and to control of the input/output interfaces 140 . . . 154 just described. The CPU 122, GPU 124 and/or control and I/O processor 126 operate under the control of computer program instructions or software which may be provided by a non-transitory machine-readable storage medium such as a hard disk drive 147 connected to the HDD interface 146, a BD drive 155 connected to the BDD interface 154, a memory card or other non-volatile memory (not shown) connected to the USB interface 140 or the like. During operation, the program instructions may be temporarily transferred to the RAM 123, 125 and/or 127, but the software is provided in these examples by the non-transitory machine-readable storage medium. In other examples, the software may be provided, for example, by the network interface 152 from a network-based non-transitory machine-readable storage medium (not shown in FIG. 1).

A broken line surrounds items within the main unit 100. The broken line extends around the hard disk drive 147 and the BD drive 155 to indicate that these are optionally part of the main unit, or they could be implemented as connectable peripherals.

The network interface 152 provides a connection to a data network such as the internet 153. The WiFi transceiver 150 and the BT transceiver 148 provide wireless radio frequency communications with one or more external devices (not shown). The camera interface 144 provides an interface to one or more cameras such as a camera 145. Note that the camera interface may be associated with the USB interface such that the physical connection of the camera 145 to the main unit 100 is via a USB connection. However, the camera interface 144 is shown separately in FIG. 1 for clarity of explanation.

The video interface 142 provides video data to an external display 143.

Figure 2:
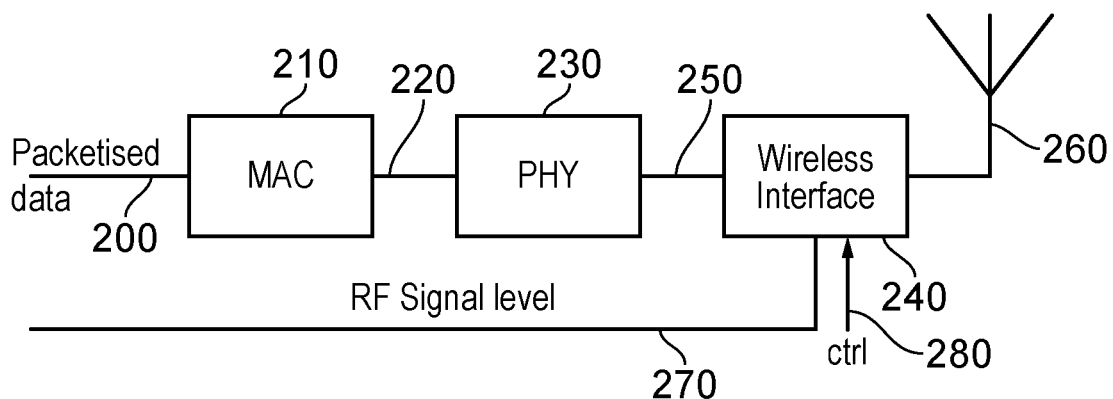
FIG. 2 schematically illustrates a WiFi transceiver.

FIG. 2 schematically illustrates a WiFi transceiver, for example for use as the WiFi transceiver 150 in FIG. 1. The principles discussed with respect to FIG. 2 apply equally to other wireless radio frequency interfaces such as so-called ZigBee or Z-wave interfaces. Such interface protocols could be used here instead.

The arrangement of FIG. 2 receives data 200, for example in packetised form, for transmission by the wireless connection provided by the WiFi transceiver. The packetised data is provided to a media access control (MAC) unit 210 which corresponds to the media access control layer of the so-called OSI 7-layer model. The MAC unit 210 incorporates a MAC header and forms an internet protocol (IP) packet having a cyclic redundancy check (CRC) value as part of the IP packet. The MAC header can include a packet length field for use by the receiver. The MAC unit 210 handles flow control at the transmit side and data reassembly at the receive side. The MAC unit provides the IP packets 220 to a PHY unit 230. The PHY unit 230 represents functionality associated with a layer of the OSI 7-layer model and provides a physical layer interface so as to interface a physical medium (in this instance, a wireless interface 240) with the MAC unit 210. The PHY unit 230 converts the MAC layer format into a format suitable to be transported over the physical medium (in this case, a wireless channel). The PHY unit 230 adds so-called forward error correction functionality to enable error correction at the receiving device and converts data bits into appropriate symbols for transmission.

The wireless interface receives the output 250 of the PHY layer and converts it into radio frequency signals for communication to a recipient device by an antenna 260.

The arrangement discussed above also operates to receive data from another communicating device. In this case, radio frequency signals are received by the antenna 260 and provided to the PHY unit 230 by the wireless interface 240. The PHY unit 230 handles forward error correction of the received signals and provides an output 220 to the MAC unit 210.

As part of its functionality, the wireless interface 240 provides an output 270 indicative of the radio frequency signal strength at the antenna 260 of a received data communication. The wireless interface is also responsive to a control signal 280 to control its current radio frequency output power in a transmitting mode.

Figure 3:
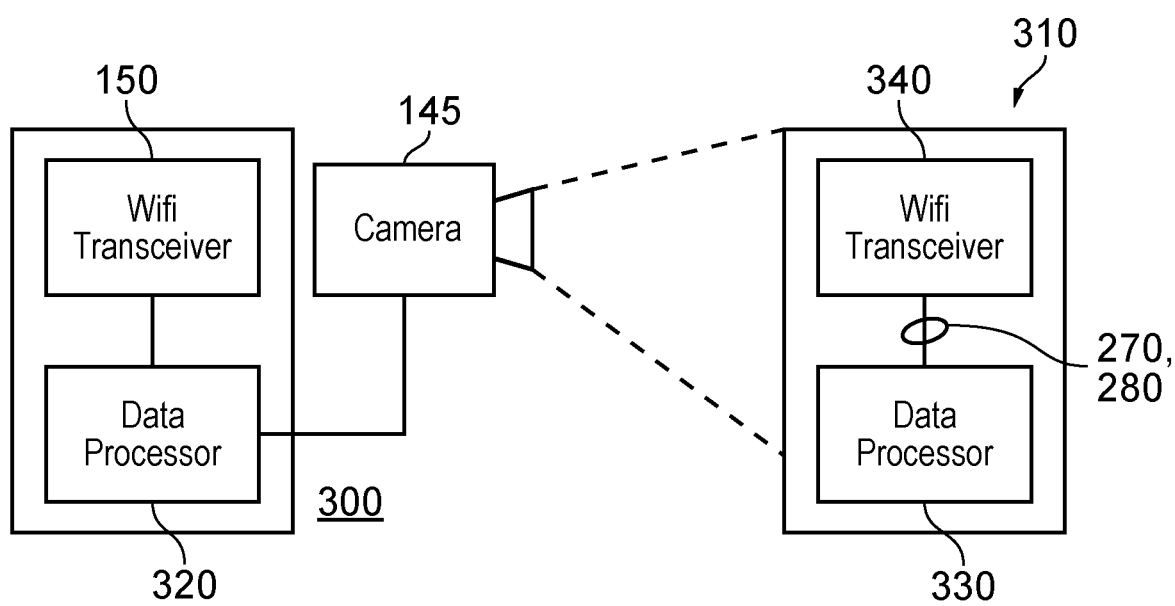
FIG. 3 schematically illustrates a data processing apparatus.

FIG. 3 schematically illustrates a data processing system comprising a data processing apparatus 300 and an external device 310. Here, the term "external" indicates that the device 310 does not form part of the apparatus 300 but is a physically separate device.

The apparatus 300 can be of the form shown in FIG. 1 and comprises a data processor 320, for example implemented by the CPU 122, the GPU 124 and/or the control and I/O processor 126 of the apparatus of FIG. 1, each operating under the control of appropriate software stored in the respective RAM 123, 125, 127 and/or on a non-transitory machine-readable storage medium such as the HDD 147 or the BD drive 155.

The apparatus 300 comprises the camera 145 discussed above, for example disposed locally to the apparatus 300 (in an example, the camera 145 could be disposed on top of or adjacent to a casing which houses the other components of the apparatus 300). The apparatus 300 also includes the WiFi transceiver 150 which may be of the form shown in FIG. 2.

The external device 310 could be a so-called Internet of Things (IoT) device such as a sensor, a controlled device or the like. It also comprises a data processor 330, for example implemented by a CPU provided at the external device and running appropriate software which may be provided by a non-transitory machine-readable storage medium. The external device has a WiFi transceiver 340 which may be of the form shown in FIG. 2. The WiFi transceiver 340 communicates data with the WiFi transceiver 150 of the apparatus 300. The camera 145 is arranged locally to the apparatus 300 and disposed so as to be able to capture images of the device 310.

Note that a set of one or more such external devices may be in wireless data communication with the apparatus 300.

With regards to the apparatus 300, the WiFi transceiver 150 of the apparatus 300 provides an example of data communication circuitry to communicate data, by wireless radio frequency communication, with a set of one or more external devices such as the device 310, the data communication circuitry being configured to detect a corresponding wireless signal strength of a data communication from each of the external devices (for example, by means of the signal 270 discussed above).

A data processor such as the data processor 320 can detect a respective estimated separation of each of the set of external devices from the apparatus 300 in dependence upon the respective detected wireless signal strengths.

An image processor (for example implemented by the data processor 320) can detect, in images captured by camera such as the camera 145, an image of an external device having image properties consistent with the estimated separation of a given one of the set of external devices from the apparatus and to associate the external device detected in the images captured by the camera with data communications between the apparatus and the given one of the set of external devices.

So, the arrangement of FIG. 3 provides a hybrid detection technique to detect and identify the location of external devices relative to the apparatus 300. Using the signal level indication 270, the data processor 320 can detect an estimated separation of a communicating external device from the apparatus 300, on the basis that the received signal strength falls of as an inverse square of the separation of the external device from the apparatus 300.

Using the camera 145, the data processor 320 detects, in the captured images, an image of an external device having image properties such as an image size which are consistent with the estimated separation of one of the set of devices detected by the wireless signal strength. Here, the term "consistent with" can imply that the image properties, as detected, themselves indicate a separation (from the camera) which is within a threshold difference (for example, within 10%) of the estimated separation generated from the wireless signal strength. This can provide an indication to the data processor 320 that the particular external device detected having the consistent separation in the images is likely to be the one providing the data communication for which that wireless signal level was detected. The data processor 320 can associate the two together, allowing the data processor 320 to derive a list or a schedule of locations (for example, in the form or a map) relative to the apparatus 300 of different wirelessly communicating devices.

Figure 4:
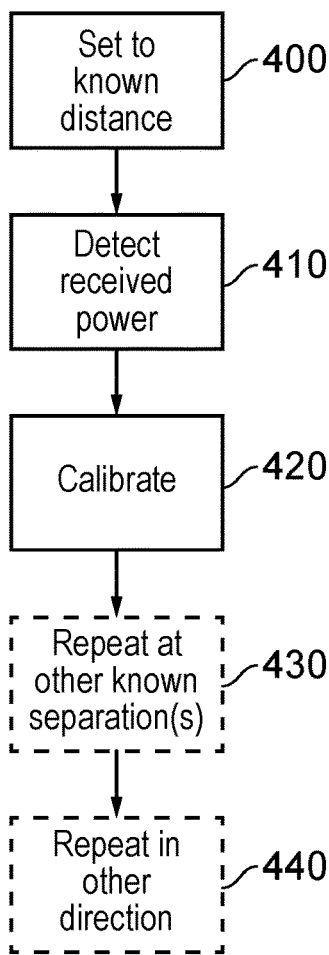
FIGS. 4 to 6 are respective schematic flowcharts illustrating methods.

FIG. 4 is a schematic flowchart illustrating a method of calibration of the arrangement of FIG. 3.

At a step 400, the external device 310 is positioned with respect to the apparatus 300 at a known distance or separation. The apparatus 300 detects the received wireless signal level for a data transmission from the device 310 at a step 410.

A step 420 calibrates data held by the data processor 320 (for example in the RAM 123, 125, 127 defining a relationship between received wireless signal strength and separation. As discussed above, this relationship follows an inverse square law relationship.

Optionally, at a step 430, the steps 400 . . . 420 can be repeated at other known separation distances, to provide other data points in the calibration data.

Optionally, at a step 440, the process can be repeated in which the estimation of distance or separation is carried out by the data processor 330 of the device 310 using the signal strength detected by the WiFi transceiver 340.

Figure 5:
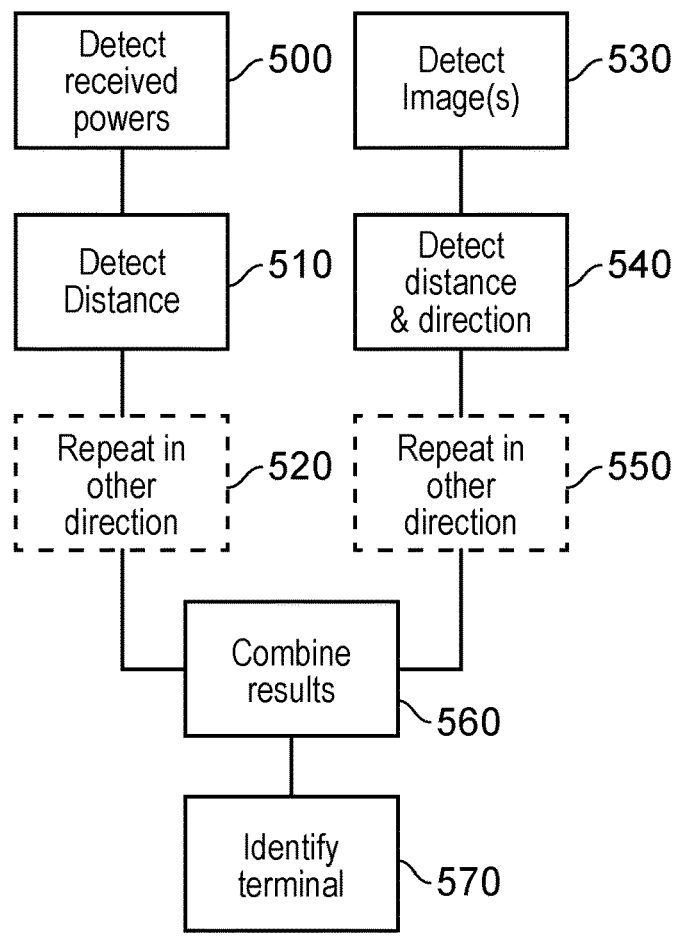

FIG. 5 is schematic flowchart illustrating a method of operation of the system of FIG. 3.

At a step 500, the apparatus 300 detects the received wireless signal strength from the one or more external devices with which the apparatus 300 is currently communicating. At a step 510, the data processor 320 detects the estimated separation or distance between the apparatus 300 and each of those devices. Optionally, at a step 520, the process is repeated in the other direction, which is to say similar detections are carried out at the external devices and results communicated to the apparatus 300 for use as an estimated separation.

At a step 530, the data processor 320, acting as an image processor, detects images of external devices in images captured by the camera 145.

At a step 540, the data processor 320 detects, for example from the image size of the captured image of the external device, an estimate of the distance of the external device from the camera 145, and optionally its direction.

Optionally, at a step 540, the process can be repeated in the other direction if any of the external devices has its own camera.

At a step 560, the two separation estimates are combined so as to associate an external device detected in the images captured by the camera with data communications between the apparatus 300 and a given one of the set of external devices having an estimated separation (from the wireless signal level) consistent with (for example, within a threshold difference of) the optically estimated separation.

This association allows the data processor 320 to identify a particular external device and its location at a step 570.

In some examples, the WiFi transceiver 340 of the external device 310 can operate at multiple different wireless transmit powers, in response to a command signal sent by the apparatus 300, which is provided to the wireless interface 240 as the signal 280.

Figure 6:
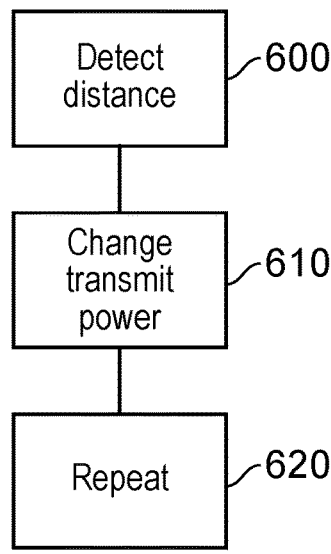

FIG. 6 is a schematic flowchart illustrating a method making use of this feature, in which, at a step 300, a separation is detected using the techniques described above. At a step 610, the apparatus 300 instructs the external device 310 to change its wireless transmit power to another power level (which is achieved by the data processor 330 providing the control signal 280 to the wireless interface 240), and at a step 620 the distance detection of the step 600 is repeated.

This arrangement provides a further opportunity for the apparatus 300 to detect an estimated distance, using a different originating power value.

As discussed above, the data processor 320 acts as an image processor to detect in the captured images, an image of an external device such as the device 310.

Figure 7:
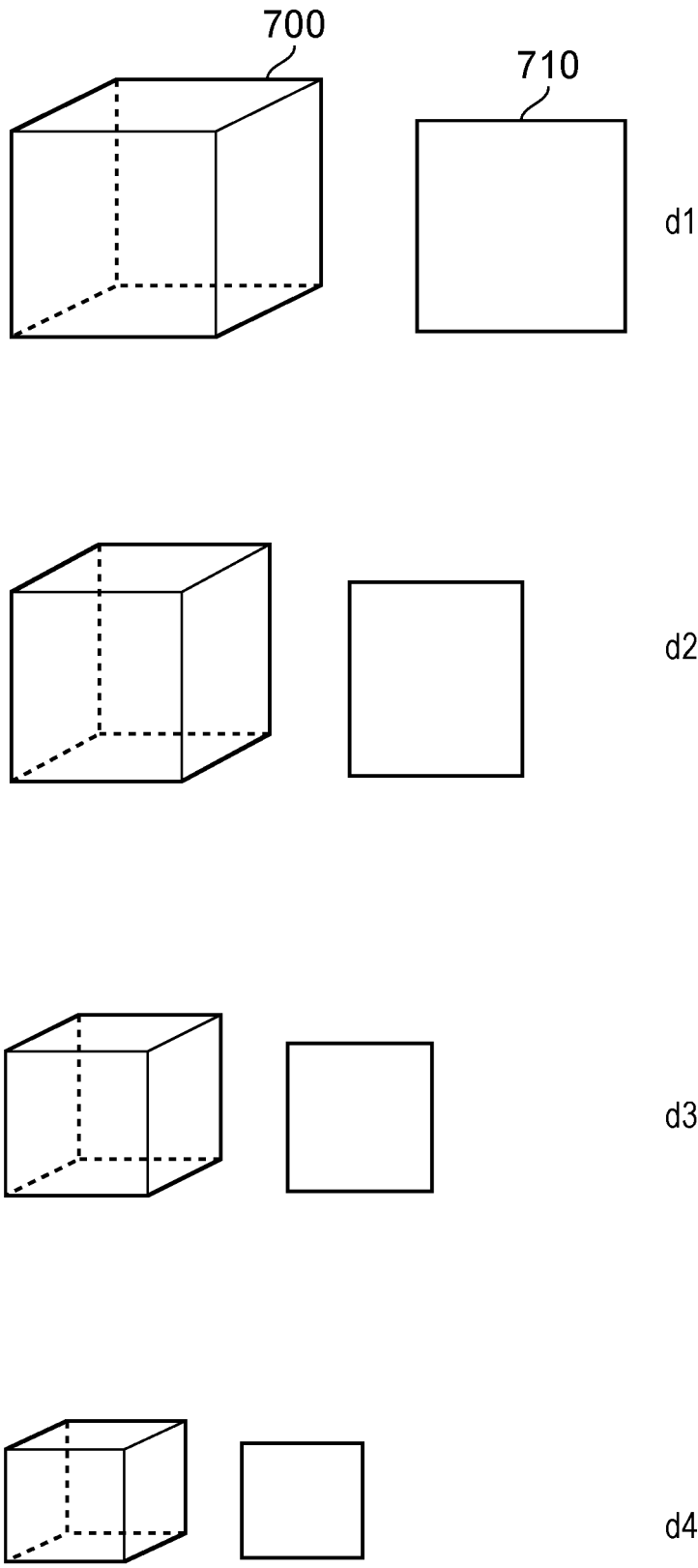
FIG. 7 schematically represents examples of image reference data.

FIG. 7 (top row) provides an example of such images assuming that the external device is a cuboid shape. The top row of FIG. 7 provides an expected perspective 700 and side elevation 710 of the external device according to its relevant orientation with respects to the apparatus 300. Here, a separation distance d1 from the camera is assumed for the purposes of the drawing and explanation.

Data representing the two expected images 700, 710 is provided to and used by the data processor 320 to allow it to recognise the external device in the captured images (for example, being stored in RAM or by the HDD or BD drive. From this data, the data processor 320 can derive other versions of expected image data such as those shown in the second to forth rows of FIG. 7 at different separation distances d2, d3, d4 based on a simple geometric scaling of the expected image size, and compare these with the captured image of the device Alternatively, the data processor 320 can compare the image size of the captured image of the device with the image data of the top row of FIG. 7, to derive a ratio of estimated separation (from the camera) to d1.

Figure 8:
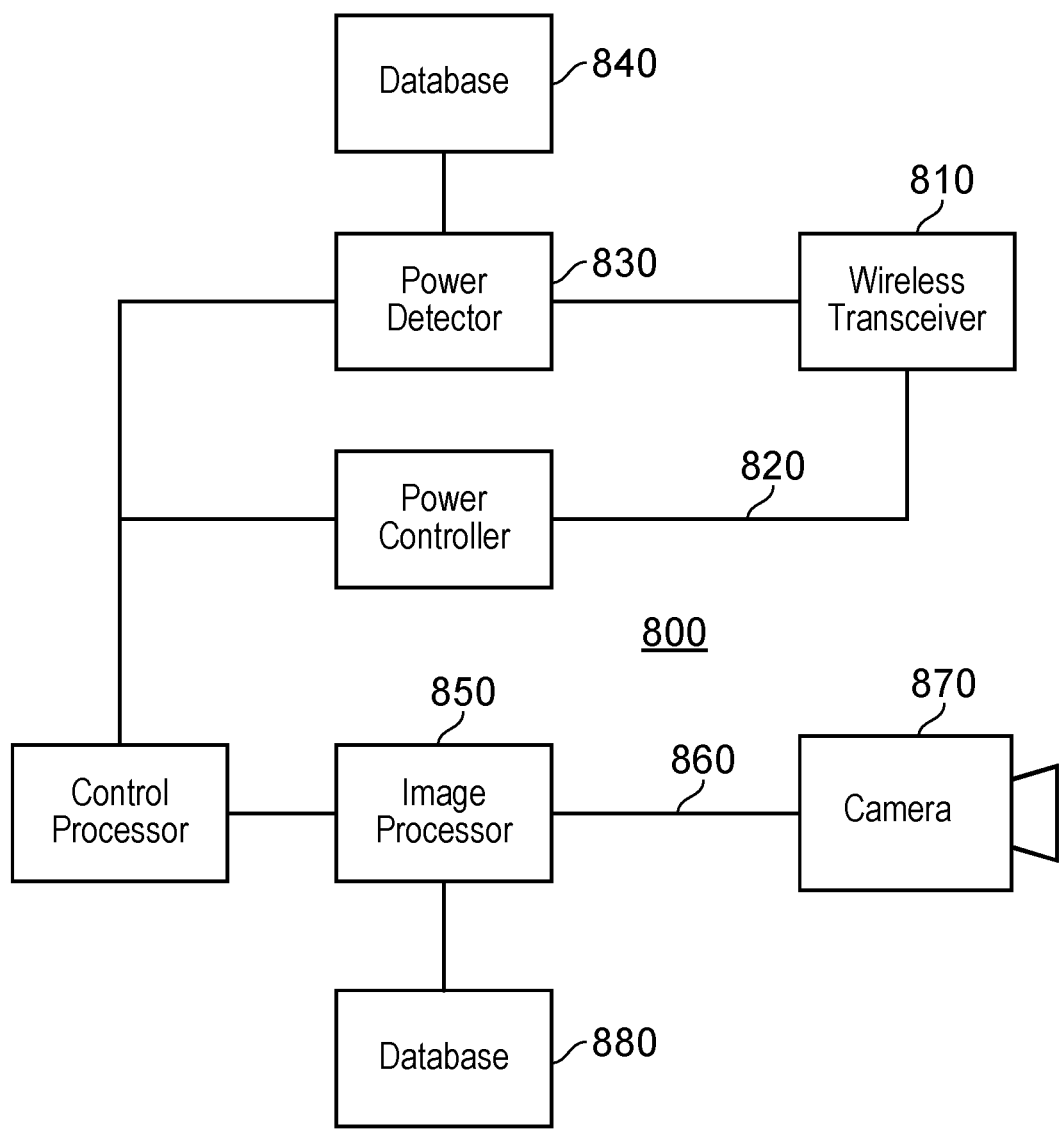
FIG. 8 schematically illustrates an example of data processing apparatus.

FIG. 8 schematically illustrates an example of data processing apparatus comprising:

data communication circuitry (such as a WiFi transceiver 810) to communicate data, by wireless radio frequency communication, with a set of one or more external devices, the data communication circuitry being configured to detect a corresponding wireless signal strength (as n output signal 820) of a data communication from each of the set of external devices;

a data processor (implemented by a power detector 830 responsive to stored calibration data 840) to detect a respective estimated separation of each of the set of external devices from the apparatus in dependence upon the respective detected wireless signal strengths; and an image processor 850 (having a database 880 of data such as that shown in FIG. 7 indicating expected images at different distances) to detect, in images 860 captured by a camera 870, an image of an external device having image properties consistent with the estimated separation of a given one of the set of external devices from the apparatus and to associate the external device detected in the images captured by the camera with data communications between the apparatus and the given one of the set of external devices.

Figure 9:
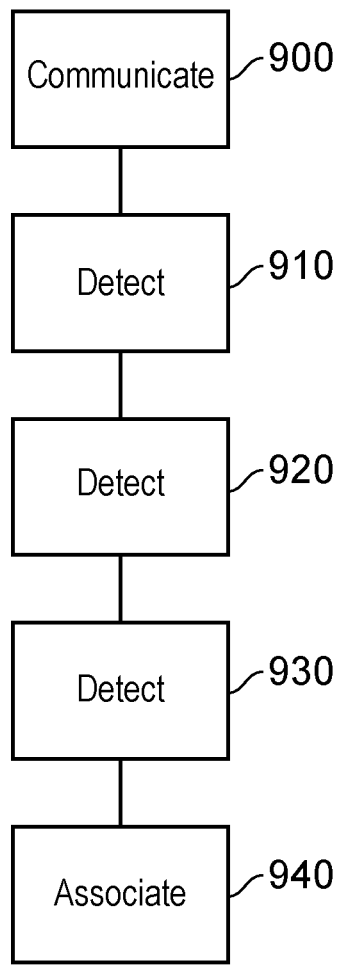
FIGS. 9 to 11 are schematic flowcharts illustrating respective methods.

FIG. 9 is a schematic flowchart illustrating a method of operation of a data processing apparatus, the method comprising:

wirelessly communicating (at a step 900) data, by radio frequency communication, with a set of one or more external devices;

detecting (at a step 910) a respective wireless signal strength of a data communication from each of the set of external devices;

detecting (at a step 920) a respective estimated separation of each of the set of external devices from the apparatus in dependence upon the detected wireless signal strengths; and detecting (at a step 930), in images captured by a camera, an image of an external device having image properties consistent with the estimated separation of a given one of the set of external devices from the apparatus; and associating (at a step 940) the external device detected in the images captured by the camera with data communications between the apparatus and the given one of the set of external devices.

Figure 10:
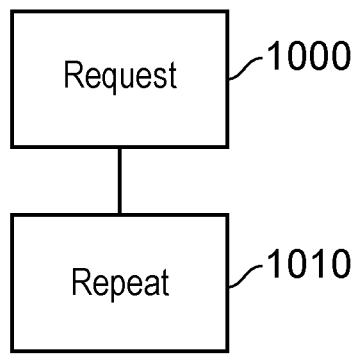

FIG. 10 is a schematic flowchart illustrating a method having further optional steps comprising:

requesting (at a step 1000) the set of one or more external devices to vary their wireless transmission power; and repeating (at a step 1010) the step of detecting a respective estimated separation with the external devices using different respective wireless transmission powers.

Figure 11:
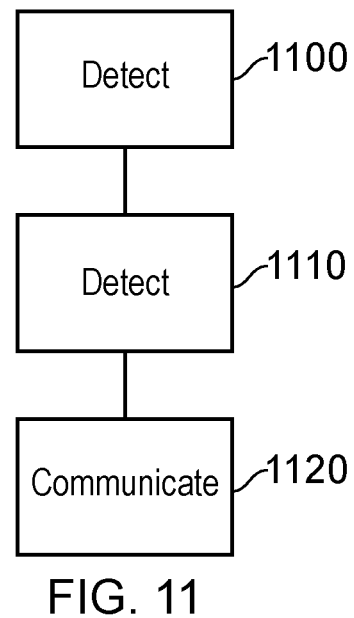

FIG. 11 is a schematic flowchart illustrating a method having further optional steps comprising:

the external devices detecting (at a step 1100) a wireless signal strength of a data communication from the apparatus; and the external devices each detecting (at a step 1110) an estimated separation that external device from the apparatus in dependence upon the detected wireless signal strength of a data communication from the apparatus; and the external devices each communicating (at a step 1120), to the apparatus, a respective estimated separation to the apparatus.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus comprising:
   data communication circuitry to communicate data, by wireless radio frequency communication, with a set of one or more external devices, the data communication circuitry being configured to detect a corresponding wireless signal strength of a data communication from each of the set of external devices;
   a data processor to detect a respective estimated separation of each of the set of external devices from the apparatus in dependence upon the respective detected wireless signal strengths; and
   an image processor to detect, in images captured by a camera, an image of an external device having image properties consistent with the estimated separation of a given one of the set of external devices from the apparatus and to associate the external device detected in the images captured by the camera with data communications between the apparatus and the given one of the set of external devices,
   wherein the data communication circuitry is configured to request the set of one or more external devices to vary their wireless transmission power and to repeat the detection of wireless signal strength with the set of one of more external devices using different respective wireless transmission powers.

2. The data processing apparatus according to claim 1, in which the image processor is configured to detect an image size of the image of the external device.

3. The data processing apparatus according to claim 1, in which the image processor is configured to detect a location of the external device relative to the apparatus.

4. The data processing apparatus according to claim 1, comprising a camera to provide the captured images.

5. A data processing system comprising:
   a data processing apparatus, comprising:
      data communication circuitry to communicate data, by wireless radio frequency communication, with a set of one or more external devices, the data communication circuitry being configured to detect a corresponding wireless signal strength of a data communication from each of the set of external devices;
      a data processor to detect a respective estimated separation of each of the set of external devices from the apparatus in dependence upon the respective detected wireless signal strengths; and
      an image processor to detect, in images captured by a camera, an image of an external device having image properties consistent with the estimated separation of a given one of the set of external devices from the apparatus and to associate the external device detected in the images captured by the camera with data communications between the apparatus and the given one of the set of external devices; and
   a set of one or more external devices each configured to communicate data wirelessly with the data communication circuitry of the apparatus,
   wherein the data communication circuitry is configured to request the set of one or more external devices to vary their wireless transmission power and to repeat the detection of wireless signal strength with the set of one of more external devices using different respective wireless transmission powers.

6. The data processing system according to claim 5, in which each of the set of one or more external devices comprises:
   second data communication circuitry to communicate data, by wireless radio frequency communication, with the apparatus, the second data communication circuitry being configured to detect a corresponding wireless signal strength of a data communication from the apparatus; and
   a second data processor to detect an estimated separation that external device from the apparatus in dependence upon the detected wireless signal strength, and to communicate the estimated separation to the apparatus.

7. A method of operation of a data processing apparatus, the method comprising:
   wirelessly communicating data, by radio frequency communication, with a set of one or more external devices;
   detecting a respective wireless signal strength of a data communication from each of the set of external devices;
   detecting a respective estimated separation of each of the set of external devices from the apparatus in dependence upon the detected wireless signal strengths; and
   detecting, in images captured by a camera, an image of an external device having image properties consistent with the estimated separation of a given one of the set of external devices from the apparatus; and
   associating the external device detected in the images captured by the camera with data communications between the apparatus and the given one of the set of external devices,
   wherein the communicating data includes requesting the set of one or more external devices to vary their wireless transmission power and to repeat the detection of wireless signal strength with the set of one of more external devices using different respective wireless transmission powers.

8. The method according to claim 7, comprising:
   requesting the set of one or more external devices to vary their wireless transmission power; and
   repeating the step of detecting a respective estimated separation with the external devices using different respective wireless transmission powers.

9. The method according to claim 7, comprising:
   the external devices detecting a wireless signal strength of a data communication from the apparatus; and
   the external devices each detecting an estimated separation that external device from the apparatus in dependence upon the detected wireless signal strength of a data communication from the apparatus; and
   the external devices each communicating, to the apparatus, a respective estimated separation to the apparatus.

10. A non-transitory machine-readable storage medium which stores computer software, which when executed by a computer causes the computer to control a data processing apparatus, by carrying out actions, comprising:
   wirelessly communicating data, by radio frequency communication, with a set of one or more external devices;
   detecting a respective wireless signal strength of a data communication from each of the set of external devices;

detecting a respective estimated separation of each of the set of external devices from the apparatus in dependence upon the detected wireless signal strengths; and detecting, in images captured by a camera, an image of an external device having image properties consistent with the estimated separation of a given one of the set of external devices from the apparatus; and associating the external device detected in the images captured by the camera with data communications between the apparatus and the given one of the set of external devices, wherein the communicating data includes requesting the set of one or more external devices to vary their wireless transmission power and to repeat the detection of wireless signal strength with the set of one of more external devices using different respective wireless transmission powers.

\* \* \* \* \*